(12) United States Patent
Moussette et al.

(10) Patent No.: US 9,886,093 B2
(45) Date of Patent: Feb. 6, 2018

(54) BAND WITH HAPTIC ACTUATORS

(71) Applicant: Apple Inc., Cupertino, CA (US)

(72) Inventors: Camille Moussette, Cupertino, CA (US); Patrick Kessler, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/025,250

(22) PCT Filed: Sep. 27, 2013

(86) PCT No.: PCT/US2013/062488
§ 371 (c)(1),
(2) Date: Mar. 25, 2016

(87) PCT Pub. No.: WO2015/047356
PCT Pub. Date: Apr. 2, 2015

(65) Prior Publication Data
US 2016/0231815 A1   Aug. 11, 2016

(51) Int. Cl.
H04B 3/36 (2006.01)
G06F 3/01 (2006.01)

(52) U.S. Cl.
CPC .................... *G06F 3/016* (2013.01)

(58) Field of Classification Search
CPC ... G06F 1/163; G06F 3/016; H01H 2003/008; G08B 6/00; A63F 13/285
USPC ............... 340/407.1, 407.2; 345/156, 173
See application file for complete search history.

(56) References Cited

U.S. PATENT DOCUMENTS

| | | | |
|---|---|---|---|
| 3,001,049 | A | 9/1961 | Didier |
| 3,390,287 | A | 6/1968 | Sonderegger |
| 3,419,739 | A | 12/1968 | Clements |
| 4,236,132 | A | 11/1980 | Zissimopoulos |
| 4,412,148 | A | 10/1983 | Klicker et al. |
| 4,414,984 | A | 11/1983 | Zarudiansky |
| 4,695,813 | A | 9/1987 | Nobutoki et al. |
| 4,975,616 | A | 12/1990 | Park |
| 5,010,772 | A | 4/1991 | Bourland |
| 5,245,734 | A | 9/1993 | Issartel |
| 5,283,408 | A | 2/1994 | Chen |

(Continued)

FOREIGN PATENT DOCUMENTS

| | | |
|---|---|---|
| AU | 2015100710 | 7/2015 |
| CA | 2355434 | 2/2002 |

(Continued)

OTHER PUBLICATIONS

U.S. Appl. No. 12/750,054, filed Mar. 30, 2010, Hill.

(Continued)

*Primary Examiner* — Thomas Mullen
(74) *Attorney, Agent, or Firm* — Brownstein Hyatt Farber Schreck, LLP

(57) ABSTRACT

A band includes one or more haptic actuators that can be activated to provide haptic stimulation to a wearer. An electronic device can be in communication with the one or more haptic actuators through a wired and/or wireless connection. The electronic device can be a separate device, or the electronic device can be removably or fixedly attached to the band. An activation signal can be sent to a single haptic actuator or to groups of two or more haptic actuators.

15 Claims, 4 Drawing Sheets

(56) References Cited

U.S. PATENT DOCUMENTS

| | | |
|---|---|---|
| 5,293,161 A | 3/1994 | MacDonald et al. |
| 5,365,140 A | 11/1994 | Ohya et al. |
| 5,434,549 A | 7/1995 | Hirabayashi et al. |
| 5,436,622 A | 7/1995 | Gutman et al. |
| 5,510,584 A | 4/1996 | Norris |
| 5,510,783 A | 4/1996 | Findlater et al. |
| 5,513,100 A | 4/1996 | Parker et al. |
| 5,587,875 A | 12/1996 | Sellers |
| 5,590,020 A | 12/1996 | Sellers |
| 5,602,715 A | 2/1997 | Lempicki et al. |
| 5,619,005 A | 4/1997 | Shibukawa et al. |
| 5,621,610 A | 4/1997 | Moore et al. |
| 5,625,532 A | 4/1997 | Sellers |
| 5,629,578 A | 5/1997 | Winzer et al. |
| 5,635,928 A | 6/1997 | Takagi et al. |
| 5,718,418 A | 2/1998 | Gugsch |
| 5,739,759 A | 4/1998 | Nakazawa et al. |
| 5,742,242 A | 4/1998 | Sellers |
| 5,783,765 A | 7/1998 | Muramatsu |
| 5,793,605 A | 8/1998 | Sellers |
| 5,812,116 A | 9/1998 | Malhi |
| 5,813,142 A | 9/1998 | Demon |
| 5,818,149 A | 10/1998 | Safari et al. |
| 5,896,076 A | 4/1999 | Van Namen |
| 5,907,199 A | 5/1999 | Miller |
| 5,951,908 A | 9/1999 | Cui et al. |
| 5,959,613 A | 9/1999 | Rosenberg et al. |
| 5,973,441 A | 10/1999 | Lo et al. |
| 5,982,304 A | 11/1999 | Selker et al. |
| 5,982,612 A | 11/1999 | Roylance |
| 5,995,026 A | 11/1999 | Sellers |
| 5,999,084 A | 12/1999 | Armstrong |
| 6,078,308 A | 6/2000 | Rosenberg et al. |
| 6,127,756 A | 10/2000 | Iwaki |
| 6,135,886 A | 10/2000 | Armstrong |
| 6,218,966 B1 | 4/2001 | Goodwin |
| 6,222,525 B1 | 4/2001 | Armstrong |
| 6,252,336 B1 | 6/2001 | Hall |
| 6,342,880 B2 | 1/2002 | Rosenberg et al. |
| 6,351,205 B1 | 2/2002 | Armstrong |
| 6,373,465 B2 | 4/2002 | Jolly et al. |
| 6,408,187 B1 | 6/2002 | Merriam |
| 6,411,276 B1 | 6/2002 | Braun et al. |
| 6,429,849 B1 | 8/2002 | An |
| 6,438,393 B1 | 8/2002 | Surronen |
| 6,444,928 B2 | 9/2002 | Okamoto et al. |
| 6,455,973 B1 | 9/2002 | Ineson |
| 6,465,921 B1 | 10/2002 | Horng |
| 6,552,404 B1 | 4/2003 | Hynes |
| 6,552,471 B1 | 4/2003 | Chandran et al. |
| 6,557,072 B2 | 4/2003 | Osborn |
| 6,642,857 B1 | 11/2003 | Schediwy |
| 6,693,626 B1 | 2/2004 | Rosenberg |
| 6,717,573 B1 | 4/2004 | Shahoian et al. |
| 6,809,462 B2 | 10/2004 | Pelrine et al. |
| 6,809,727 B2 | 10/2004 | Piot et al. |
| 6,864,877 B2 | 3/2005 | Braun et al. |
| 6,906,697 B2 | 6/2005 | Rosenberg |
| 6,906,700 B1 | 6/2005 | Armstrong |
| 6,906,703 B2 | 6/2005 | Vablais et al. |
| 6,952,203 B2 | 10/2005 | Banerjee et al. |
| 6,954,657 B2 | 10/2005 | Bork et al. |
| 6,963,762 B2 | 11/2005 | Kaaresoja et al. |
| 6,995,752 B2 | 2/2006 | Lu |
| 7,005,811 B2 | 2/2006 | Wakuda et al. |
| 7,016,707 B2 | 3/2006 | Fujisawa et al. |
| 7,022,927 B2 | 4/2006 | Hsu |
| 7,023,112 B2 | 4/2006 | Miyamoto et al. |
| 7,081,701 B2 | 7/2006 | Yoon et al. |
| 7,121,147 B2 | 10/2006 | Okada |
| 7,123,948 B2 | 10/2006 | Nielsen |
| 7,130,664 B1 | 10/2006 | Williams |
| 7,136,045 B2 | 11/2006 | Rosenberg et al. |
| 7,161,580 B2 | 1/2007 | Bailey et al. |
| 7,162,928 B2 | 1/2007 | Shank et al. |
| 7,170,498 B2 | 1/2007 | Huang |
| 7,176,906 B2 | 2/2007 | Williams et al. |
| 7,182,691 B1 | 2/2007 | Schena |
| 7,194,645 B2 | 3/2007 | Bieswanger et al. |
| 7,217,891 B2 | 5/2007 | Fischer et al. |
| 7,218,310 B2 | 5/2007 | Tierling et al. |
| 7,219,561 B2 | 5/2007 | Okada |
| 7,253,350 B2 | 8/2007 | Noro et al. |
| 7,333,604 B2 | 2/2008 | Zernovizky et al. |
| 7,334,350 B2 | 2/2008 | Ellis |
| 7,348,968 B2 | 3/2008 | Dawson |
| 7,388,741 B2 | 6/2008 | Konuma et al. |
| 7,392,066 B2 | 6/2008 | Hapamas |
| 7,423,631 B2 | 9/2008 | Shahoian et al. |
| 7,446,752 B2 | 11/2008 | Goldenberg et al. |
| 7,469,595 B2 | 12/2008 | Kessler et al. |
| 7,495,358 B2 | 2/2009 | Kobayashi et al. |
| 7,508,382 B2 | 3/2009 | Denoue et al. |
| 7,561,142 B2 | 7/2009 | Shahoian et al. |
| 7,562,468 B2 | 7/2009 | Ellis |
| 7,569,086 B2 | 8/2009 | Chandran |
| 7,586,220 B2 | 9/2009 | Roberts |
| 7,639,232 B2 | 12/2009 | Grant et al. |
| 7,641,618 B2 | 1/2010 | Noda et al. |
| 7,675,253 B2 | 3/2010 | Dorel |
| 7,675,414 B2 | 3/2010 | Ray |
| 7,679,611 B2 | 3/2010 | Schena |
| 7,707,742 B2 | 5/2010 | Ellis |
| 7,710,399 B2 | 5/2010 | Bruneau et al. |
| 7,732,951 B2 | 6/2010 | Mukaide |
| 7,742,036 B2 | 6/2010 | Grant et al. |
| 7,793,429 B2 | 9/2010 | Ellis |
| 7,793,430 B2 | 9/2010 | Ellis |
| 7,798,982 B2 | 9/2010 | Zets et al. |
| 7,868,489 B2 | 1/2011 | Amemiya et al. |
| 7,886,621 B2 | 2/2011 | Smith et al. |
| 7,886,631 B2 | 2/2011 | Smith et al. |
| 7,888,892 B2 | 2/2011 | McReynolds et al. |
| 7,893,922 B2 | 2/2011 | Klinghult et al. |
| 7,919,945 B2 | 4/2011 | Houston et al. |
| 7,929,382 B2 | 4/2011 | Yamazaki |
| 7,946,483 B2 | 5/2011 | Miller et al. |
| 7,952,261 B2 | 5/2011 | Lipton et al. |
| 7,952,566 B2 | 5/2011 | Poupyrev et al. |
| 7,956,770 B2 | 6/2011 | Klinghult et al. |
| 7,961,909 B2 | 6/2011 | Mandella et al. |
| 8,031,172 B2 | 10/2011 | Kruse et al. |
| 8,044,940 B2 | 10/2011 | Narusawa |
| 8,069,881 B1 | 12/2011 | Cunha |
| 8,077,145 B2 | 12/2011 | Rosenberg et al. |
| 8,081,156 B2 | 12/2011 | Ruettiger |
| 8,082,640 B2 | 12/2011 | Takeda |
| 8,098,234 B2 | 1/2012 | Lacroix et al. |
| 8,123,660 B2 | 2/2012 | Kruse et al. |
| 8,125,453 B2 | 2/2012 | Shahoian et al. |
| 8,141,276 B2 | 3/2012 | Ellis |
| 8,156,809 B2 | 4/2012 | Tierling et al. |
| 8,174,372 B2 | 5/2012 | da Costa |
| 8,179,202 B2 | 5/2012 | Cruz-Hernandez et al. |
| 8,188,623 B2 | 5/2012 | Park |
| 8,205,356 B2 | 6/2012 | Ellis |
| 8,232,494 B2 | 7/2012 | Purcocks |
| 8,248,277 B2 | 8/2012 | Peterson et al. |
| 8,248,278 B2 | 8/2012 | Schlosser et al. |
| 8,253,686 B2 | 8/2012 | Kyung et al. |
| 8,261,468 B2 | 9/2012 | Ellis |
| 8,264,465 B2 | 9/2012 | Grant et al. |
| 8,270,114 B2 | 9/2012 | Argumedo et al. |
| 8,288,899 B2 | 10/2012 | Park et al. |
| 8,291,614 B2 | 10/2012 | Ellis |
| 8,294,600 B2 | 10/2012 | Peterson et al. |
| 8,315,746 B2 | 11/2012 | Cox et al. |
| 8,344,834 B2 | 1/2013 | Niiyama |
| 8,378,797 B2 | 2/2013 | Pance et al. |
| 8,378,798 B2 | 2/2013 | Bells et al. |
| 8,378,965 B2 | 2/2013 | Gregorio et al. |
| 8,390,594 B2 | 3/2013 | Modarres et al. |
| 8,395,587 B2 | 3/2013 | Cauwels et al. |
| 8,398,570 B2 | 3/2013 | Mortimer et al. |

(56) References Cited

U.S. PATENT DOCUMENTS

| | | | |
|---|---|---|---|
| 8,446,264 B2 | 5/2013 | Tanase |
| 8,451,255 B2 | 5/2013 | Weber et al. |
| 8,461,951 B2 | 6/2013 | Gassmann et al. |
| 8,466,889 B2 | 6/2013 | Tong et al. |
| 8,471,690 B2 | 6/2013 | Hennig et al. |
| 8,487,759 B2 | 7/2013 | Hill |
| 8,515,398 B2 | 8/2013 | Song et al. |
| 8,542,134 B2 | 9/2013 | Peterson et al. |
| 8,545,322 B2 | 10/2013 | George et al. |
| 8,547,341 B2 | 10/2013 | Takashima et al. |
| 8,552,859 B2 | 10/2013 | Pakula et al. |
| 8,570,291 B2 | 10/2013 | Motomura |
| 8,575,794 B2 | 11/2013 | Lee et al. |
| 8,587,955 B2 | 11/2013 | DiFonzo et al. |
| 8,596,755 B2 | 12/2013 | Hibi |
| 8,598,893 B2 | 12/2013 | Camus |
| 8,599,047 B2 | 12/2013 | Schlosser et al. |
| 8,599,152 B1 | 12/2013 | Wurtenberger et al. |
| 8,600,354 B2 | 12/2013 | Esaki |
| 8,614,431 B2 | 12/2013 | Huppi et al. |
| 8,621,348 B2 | 12/2013 | Ramsay et al. |
| 8,633,916 B2 | 1/2014 | Bernstein et al. |
| 8,674,941 B2 | 3/2014 | Casparian et al. |
| 8,680,723 B2 | 3/2014 | Subramanian |
| 8,681,092 B2 | 3/2014 | Harada et al. |
| 8,686,952 B2 | 4/2014 | Pope et al. |
| 8,710,966 B2 | 4/2014 | Hill |
| 8,723,813 B2 | 5/2014 | Park et al. |
| 8,735,755 B2 | 5/2014 | Peterson et al. |
| 8,760,273 B2 | 6/2014 | Casparian et al. |
| 8,787,006 B2 | 7/2014 | Golko et al. |
| 8,798,534 B2 | 8/2014 | Rodriguez et al. |
| 8,836,502 B2 | 9/2014 | Culbert et al. |
| 8,845,071 B2 | 9/2014 | Yamamoto et al. |
| 8,857,248 B2 | 10/2014 | Shih et al. |
| 8,860,562 B2 | 10/2014 | Hill |
| 8,866,600 B2 | 10/2014 | Yang et al. |
| 8,890,668 B2 | 11/2014 | Pance et al. |
| 8,928,621 B2 | 1/2015 | Ciesla et al. |
| 8,948,821 B2 | 2/2015 | Newham et al. |
| 8,970,534 B2 | 3/2015 | Adachi et al. |
| 8,976,141 B2 | 3/2015 | Myers et al. |
| 9,008,730 B2 | 4/2015 | Kim et al. |
| 9,012,795 B2 | 4/2015 | Niu |
| 9,013,426 B2 | 4/2015 | Cole et al. |
| 9,019,088 B2 | 4/2015 | Zawacki et al. |
| 9,072,576 B2 | 7/2015 | Nishiura |
| 9,083,821 B2 | 7/2015 | Hughes |
| 9,092,129 B2 | 7/2015 | Abdo et al. |
| 9,122,325 B2 | 9/2015 | Peshkin et al. |
| 9,131,039 B2 | 9/2015 | Behles |
| 9,158,379 B2 | 10/2015 | Cruz-Hernandez et al. |
| 9,178,509 B2 | 11/2015 | Bernstein |
| 9,189,932 B2 | 11/2015 | Kerdemelidis et al. |
| 9,201,458 B2 | 12/2015 | Hunt et al. |
| 9,202,355 B2 | 12/2015 | Hill |
| 9,235,267 B2 | 1/2016 | Pope et al. |
| 9,274,601 B2 | 3/2016 | Faubert et al. |
| 9,274,602 B2 | 3/2016 | Garg et al. |
| 9,274,603 B2 | 3/2016 | Modarres et al. |
| 9,275,815 B2 | 3/2016 | Hoffmann |
| 9,293,054 B2 | 3/2016 | Bruni et al. |
| 9,300,181 B2 | 3/2016 | Maeda et al. |
| 9,310,906 B2 | 4/2016 | Yumiki et al. |
| 9,317,118 B2 | 4/2016 | Puskarich |
| 9,325,230 B2 | 4/2016 | Yamada et al. |
| 9,357,052 B2 | 5/2016 | Ullrich |
| 9,390,599 B2 | 7/2016 | Weinberg |
| 9,396,434 B2 | 7/2016 | Rothkopf |
| 9,405,369 B2 | 8/2016 | Modarres et al. |
| 9,449,476 B2 | 9/2016 | Lynn |
| 9,477,342 B2 | 10/2016 | Daverman et al. |
| 9,501,912 B1 | 11/2016 | Havskjold et al. |
| 9,594,450 B2 | 7/2017 | Lynn et al. |
| 9,779,592 B1 | 10/2017 | Hoen |
| 2003/0210259 A1 | 11/2003 | Liu |
| 2004/0021663 A1 | 2/2004 | Suzuki et al. |
| 2004/0127198 A1 | 7/2004 | Roskind et al. |
| 2005/0057528 A1 | 3/2005 | Kleen |
| 2005/0107129 A1 | 5/2005 | Kaewell et al. |
| 2005/0110778 A1 | 5/2005 | Ben Ayed |
| 2005/0118922 A1 | 6/2005 | Endo |
| 2005/0217142 A1 | 10/2005 | Ellis |
| 2005/0237306 A1 | 10/2005 | Klein et al. |
| 2005/0248549 A1 | 11/2005 | Dietz et al. |
| 2005/0258715 A1 | 11/2005 | Schlabach |
| 2006/0014569 A1 | 1/2006 | DelGiorno |
| 2006/0154674 A1 | 7/2006 | Landschaft et al. |
| 2006/0209037 A1 | 9/2006 | Wang et al. |
| 2006/0239746 A1 | 10/2006 | Grant |
| 2006/0252463 A1 | 11/2006 | Liao |
| 2007/0099574 A1 | 5/2007 | Wang |
| 2007/0152974 A1 | 7/2007 | Kim et al. |
| 2007/0178942 A1 | 8/2007 | Sadler et al. |
| 2007/0188450 A1 | 8/2007 | Hernandez et al. |
| 2008/0084384 A1 | 4/2008 | Gregorio et al. |
| 2008/0158149 A1 | 7/2008 | Levin |
| 2008/0165148 A1 | 7/2008 | Williamson |
| 2008/0181501 A1 | 7/2008 | Faraboschi |
| 2008/0181706 A1 | 7/2008 | Jackson |
| 2008/0192014 A1 | 8/2008 | Kent et al. |
| 2008/0204428 A1 | 8/2008 | Pierce et al. |
| 2008/0255794 A1 | 10/2008 | Levine |
| 2009/0002328 A1 | 1/2009 | Ullrich et al. |
| 2009/0076723 A1* | 3/2009 | Moloney ............ G01C 21/3652 701/472 |
| 2009/0115734 A1 | 5/2009 | Fredriksson et al. |
| 2009/0120105 A1 | 5/2009 | Ramsay et al. |
| 2009/0128503 A1 | 5/2009 | Grant et al. |
| 2009/0135142 A1 | 5/2009 | Fu et al. |
| 2009/0167677 A1 | 7/2009 | Kruse et al. |
| 2009/0167702 A1 | 7/2009 | Nurmi |
| 2009/0167704 A1 | 7/2009 | Terlizzi et al. |
| 2009/0218148 A1 | 9/2009 | Hugeback et al. |
| 2009/0225046 A1 | 9/2009 | Kim et al. |
| 2009/0236210 A1 | 9/2009 | Clark et al. |
| 2009/0267892 A1 | 10/2009 | Faubert |
| 2009/0313542 A1 | 12/2009 | Cruz-Hernandez et al. |
| 2010/0020036 A1 | 1/2010 | Hui et al. |
| 2010/0053087 A1 | 3/2010 | Dai et al. |
| 2010/0079264 A1 | 4/2010 | Hoellwarth |
| 2010/0089735 A1 | 4/2010 | Takeda et al. |
| 2010/0141606 A1 | 6/2010 | Bae et al. |
| 2010/0152620 A1 | 6/2010 | Ramsay et al. |
| 2010/0160016 A1* | 6/2010 | Shimabukuro ..... G07F 17/3209 463/16 |
| 2010/0164894 A1* | 7/2010 | Kim .................... G06F 3/016 345/173 |
| 2010/0188422 A1 | 7/2010 | Shingai et al. |
| 2010/0194547 A1 | 8/2010 | Terrell et al. |
| 2010/0231508 A1 | 9/2010 | Cruz-Hernandez et al. |
| 2010/0231550 A1 | 9/2010 | Cruz-Hernandez et al. |
| 2010/0265197 A1 | 10/2010 | Purdy |
| 2010/0309141 A1 | 12/2010 | Cruz-Hernandez et al. |
| 2010/0328229 A1 | 12/2010 | Weber et al. |
| 2011/0053577 A1* | 3/2011 | Lee .................... H04M 1/72552 455/418 |
| 2011/0061017 A1* | 3/2011 | Ullrich ................ G06F 3/016 715/780 |
| 2011/0075835 A1* | 3/2011 | Hill .................... H04M 1/72563 340/407.1 |
| 2011/0107958 A1 | 5/2011 | Pance et al. |
| 2011/0121765 A1 | 5/2011 | Anderson et al. |
| 2011/0128239 A1 | 6/2011 | Polyakov et al. |
| 2011/0148608 A1 | 6/2011 | Grant et al. |
| 2011/0163985 A1 | 7/2011 | Bae et al. |
| 2011/0193824 A1 | 8/2011 | Modarres et al. |
| 2011/0248948 A1 | 10/2011 | Griffin et al. |
| 2011/0260988 A1 | 10/2011 | Colgate et al. |
| 2011/0263200 A1 | 10/2011 | Thornton et al. |
| 2011/0291950 A1 | 12/2011 | Tong |
| 2011/0304559 A1 | 12/2011 | Pasquero |
| 2012/0028577 A1* | 2/2012 | Rodriguez ......... H04N 21/44008 455/41.1 |

(56) References Cited

U.S. PATENT DOCUMENTS

| | | |
|---|---|---|
| 2012/0068957 A1 | 3/2012 | Puskarich et al. |
| 2012/0075198 A1 | 3/2012 | Sulem et al. |
| 2012/0092263 A1 | 4/2012 | Peterson et al. |
| 2012/0126959 A1 | 5/2012 | Zarrabi et al. |
| 2012/0127088 A1 | 5/2012 | Pance et al. |
| 2012/0133494 A1 | 5/2012 | Cruz-Hernandez et al. |
| 2012/0139844 A1* | 6/2012 | Ramstein .......... G06F 3/016 345/173 |
| 2012/0194976 A1* | 8/2012 | Golko .......... G06F 1/163 361/679.01 |
| 2012/0256848 A1 | 10/2012 | Madabusi Srinivasan |
| 2012/0268412 A1 | 10/2012 | Cruz-Hernandez et al. |
| 2012/0274578 A1 | 11/2012 | Snow et al. |
| 2012/0280927 A1 | 11/2012 | Ludwig |
| 2012/0327006 A1 | 12/2012 | Israr et al. |
| 2013/0002411 A1 | 1/2013 | Henderson |
| 2013/0027345 A1 | 1/2013 | Binzel |
| 2013/0063285 A1 | 3/2013 | Elias |
| 2013/0063356 A1 | 3/2013 | Martisauskas |
| 2013/0106699 A1 | 5/2013 | Babatunde |
| 2013/0191741 A1 | 7/2013 | Dickinson et al. |
| 2013/0200732 A1 | 8/2013 | Jun et al. |
| 2013/0207793 A1 | 8/2013 | Weaber et al. |
| 2013/0217491 A1 | 8/2013 | Hilbert et al. |
| 2013/0222280 A1 | 8/2013 | Sheynblat et al. |
| 2013/0228023 A1 | 9/2013 | Drasnin et al. |
| 2013/0261811 A1 | 10/2013 | Yagi et al. |
| 2013/0293494 A1* | 11/2013 | Reshef ............ G06F 3/016 345/173 |
| 2013/0300590 A1 | 11/2013 | Dietz et al. |
| 2014/0035397 A1 | 2/2014 | Endo et al. |
| 2014/0082490 A1 | 3/2014 | Jung et al. |
| 2014/0197936 A1 | 7/2014 | Biggs et al. |
| 2014/0197946 A1* | 7/2014 | Park .............. G08B 21/18 340/539.11 |
| 2014/0232534 A1 | 8/2014 | Birnbaum et al. |
| 2014/0247227 A1 | 9/2014 | Jiang et al. |
| 2014/0267076 A1 | 9/2014 | Birnbaum et al. |
| 2014/0267952 A1 | 9/2014 | Sirois |
| 2014/0368428 A1* | 12/2014 | Pinault .......... A63F 13/06 345/156 |
| 2015/0005039 A1 | 1/2015 | Liu et al. |
| 2015/0090572 A1 | 4/2015 | Lee et al. |
| 2015/0169059 A1 | 6/2015 | Behles et al. |
| 2015/0192414 A1 | 7/2015 | Das et al. |
| 2015/0194165 A1 | 7/2015 | Faaborg et al. |
| 2015/0220199 A1 | 8/2015 | Wang et al. |
| 2015/0227204 A1 | 8/2015 | Gipson et al. |
| 2015/0296480 A1 | 10/2015 | Kinsey et al. |
| 2015/0324049 A1 | 11/2015 | Kies et al. |
| 2015/0349619 A1 | 12/2015 | Degner et al. |
| 2016/0049265 A1 | 2/2016 | Bernstein |
| 2016/0063826 A1 | 3/2016 | Morrell et al. |
| 2016/0071384 A1 | 3/2016 | Hill |
| 2016/0162025 A1 | 6/2016 | Shah |
| 2016/0163165 A1 | 6/2016 | Morrell et al. |
| 2016/0172953 A1 | 6/2016 | Hamel et al. |
| 2016/0195929 A1 | 7/2016 | Martinez et al. |
| 2016/0196935 A1 | 7/2016 | Bernstein |
| 2016/0206921 A1 | 7/2016 | Szabados et al. |
| 2016/0211736 A1 | 7/2016 | Moussette et al. |
| 2016/0216764 A1 | 7/2016 | Morrell et al. |
| 2016/0216766 A1 | 7/2016 | Puskarich |
| 2016/0233012 A1 | 8/2016 | Lubinski et al. |
| 2016/0241119 A1 | 8/2016 | Keeler |
| 2016/0259480 A1 | 9/2016 | Augenbergs et al. |
| 2016/0306423 A1 | 10/2016 | Uttermann et al. |
| 2016/0371942 A1 | 12/2016 | Smith, IV et al. |
| 2017/0038905 A1 | 2/2017 | Bijamov et al. |
| 2017/0070131 A1 | 3/2017 | Degner et al. |
| 2017/0257844 A1 | 9/2017 | Miller et al. |
| 2017/0285747 A1 | 10/2017 | Chen |
| 2017/0311282 A1 | 10/2017 | Miller et al. |

FOREIGN PATENT DOCUMENTS

| | | |
|---|---|---|
| CN | 1817321 | 8/2006 |
| CN | 101409164 | 4/2009 |
| CN | 102025257 | 4/2011 |
| CN | 102315747 | 1/2012 |
| CN | 102591512 | 7/2012 |
| CN | 102713805 | 10/2012 |
| CN | 103416043 | 11/2013 |
| DE | 19517630 | 11/1996 |
| DE | 10330024 | 1/2005 |
| DE | 102009038103 | 2/2011 |
| DE | 102011115762 | 4/2013 |
| EP | 0483955 | 5/1992 |
| EP | 1047258 | 10/2000 |
| EP | 1686776 | 8/2006 |
| EP | 2060967 | 5/2009 |
| EP | 2073099 | 6/2009 |
| EP | 2194444 | 6/2010 |
| EP | 2264562 A2 | 12/2010 |
| EP | 2315186 | 4/2011 |
| EP | 2374430 | 10/2011 |
| EP | 2395414 | 12/2011 |
| EP | 2461228 | 6/2012 |
| EP | 2631746 | 8/2013 |
| EP | 2434555 | 10/2013 |
| JP | H05301342 A2 | 11/1993 |
| JP | 2002199689 | 7/2002 |
| JP | 2002102799 | 9/2002 |
| JP | 200362525 | 3/2003 |
| JP | 2004236202 | 8/2004 |
| KR | 20050033909 | 4/2005 |
| KR | 1020100046602 | 5/2010 |
| KR | 1020110101516 | 9/2011 |
| KR | 20130024420 | 3/2013 |
| TW | 200518000 | 11/2007 |
| TW | 201218039 | 5/2012 |
| TW | 201425180 | 7/2014 |
| WO | WO 97/16932 | 5/1997 |
| WO | WO 01/059588 | 8/2001 |
| WO | WO 02/073587 | 9/2002 |
| WO | WO 03/038800 | 5/2003 |
| WO | WO 06/057770 | 6/2006 |
| WO | WO 07/114631 | 10/2007 |
| WO | WO 08/075082 | 6/2008 |
| WO | WO 09/038862 | 3/2009 |
| WO | WO 09/068986 | 6/2009 |
| WO | WO 09/097866 | 8/2009 |
| WO | WO 09/122331 | 10/2009 |
| WO | WO 09/150287 | 12/2009 |
| WO | WO 10/085575 | 7/2010 |
| WO | WO 10/087925 | 8/2010 |
| WO | WO 11/007263 | 1/2011 |
| WO | WO 12/052635 | 4/2012 |
| WO | WO 12/129247 | 9/2012 |
| WO | WO 13/069148 | 5/2013 |
| WO | WO 13/169302 | 11/2013 |
| WO | WO 14/018086 | 1/2014 |
| WO | WO 13/169299 | 11/2014 |
| WO | WO 15/023670 | 2/2015 |

OTHER PUBLICATIONS

U.S. Appl. No. 12/887,455, filed Sep. 21, 2010, Puskarich et al.
U.S. Appl. No. 12/950,940, filed Nov. 19, 2010, Pance et al.
U.S. Appl. No. 13/630,867, filed Sep. 28, 2012, Bernstein.
U.S. Appl. No. 13/943,639, filed Jul. 16, 2013, Hill.
U.S. Appl. No. 14/059,693, filed Oct. 22, 2013, Puskarich.
U.S. Appl. No. 14/165,475, filed Jan. 27, 2014, Havskjold et al.
U.S. Appl. No. 14/493,190, filed Sep. 22, 2014, Hoen.
U.S. Appl. No. 14/512,927, filed Oct. 13, 2014, Hill.
U.S. Appl. No. 14/728,505, filed Jun. 2, 2015, Degner et al.
U.S. Appl. No. 14/841,582, filed Aug. 31, 2015, Morrell et al.
U.S. Appl. No. 14/928,465, filed Oct. 30, 2015, Bernstein.
U.S. Appl. No. 14/942,521, filed Nov. 16, 2015, Hill.
U.S. Appl. No. 14/910,108, filed Feb. 4, 2016, Martinez et al.
U.S. Appl. No. 15/045,761, filed Feb. 17, 2016, Morrell et al.

(56) References Cited

OTHER PUBLICATIONS

U.S. Appl. No. 15/046,194, filed Feb. 17, 2016, Degner et al.
U.S. Appl. No. 15/047,447, filed Feb. 18, 2016, Augenbergs et al.
U.S. Appl. No. 15/068,038, filed Mar. 11, 2016, Bernstein.
U.S. Appl. No. 15/025,243, filed Mar. 25, 2016, Keeler.
U.S. Appl. No. 15/025,425, filed Mar. 28, 2016, Moussette et al.
U.S. Appl. No. 15/025,277, filed Mar. 27, 2016, Morrell et al.
U.S. Appl. No. 15/025,254, filed Mar. 25, 2016, Lubinski et al.
U.S. Appl. No. 15/091,501, filed Apr. 5, 2016, Puskarich.
U.S. Appl. No. 15/098,669, filed Apr. 14, 2016, Uttermann et al.
U.S. Appl. No. 15/102,826, filed Jun. 8, 2016, Smith et al.
International Search Report and Written Opinion dated Mar. 27, 2014, PCT/US2013/062488, 10 pages.
Astronomer's Toolbox, "The Electromagnetic Spectrum," http://imagine.gsfc.nasa.gov/science/toolbox/emspectrum1.html, updated Mar. 2013, 4 pages.
Hasser et al., "Preliminary Evaluation of a Shape-Memory Alloy Tactile Feedback Display," Advances in Robotics, Mechantronics, and Haptic Interfaces, ASME, DSC—vol. 49, pp. 73-80, 1993.
Hill et al., "Real-time Estimation of Human Impedance for Haptic Interfaces," Stanford Telerobotics Laboratory, Department of Mechanical Engineering, Stanford University, Third Joint Eurohaptics Conference and Symposium on Haptic Interfaces for Virtual Environment and Teleoperator Systems, Salt Lake City, Utah, Mar. 18-20, 2009, pp. 440-445.
Kim et al., "Tactile Rendering of 3D Features on Touch Surfaces," UIST '13, Oct. 8-11, 2013, St. Andrews, United Kingdom, 8 pages.
Lee et al, "Haptic Pen: Tactile Feedback Stylus for Touch Screens," Mitsubishi Electric Research Laboratories, http://wwwlmerl.com, 6 pages, Oct. 2004.
U.S. Appl. No. 15/251,459, filed Aug. 30, 2016, Miller et al.
U.S. Appl. No. 15/260,047, filed Sep. 8, 2016, Degner.
U.S. Appl. No. 15/306,034, filed Oct. 21, 2016, Bijamov et al.
U.S. Appl. No. 15/364,822, filed Nov. 30, 2016, Chen.
U.S. Appl. No. 15/583,938, filed May 1, 2017, Hill.
U.S. Appl. No. 15/621,966, filed Jun. 13, 2017, Pedder et al.
U.S. Appl. No. 15/621,930, filed Jun. 13, 2017, Wen et al.
U.S. Appl. No. 15/622,017, filed Jun. 13, 2017, Yang et al.
U.S. Appl. No. 15/641,192, filed Jul. 3, 2017, Miller et al.
Nakamura, "A Torso Haptic Display Based on Shape Memory Alloy Actuators," Massachusetts Institute of Technology, 2003, pp. 1-123.

* cited by examiner

BAND WITH HAPTIC ACTUATORS

CROSS REFERENCE TO RELATED APPLICATION

This application is a 35 U.S.C. § 371 application of PCT/US2013/062488, filed on Sep. 27, 2013, and entitled "Band with Haptic Actuators," which is incorporated by reference as if fully disclosed herein.

TECHNICAL FIELD

The present invention relates generally to electronic devices and more particularly to an electronic device in communication with a band having one or more haptic actuators that provide haptic feedback to a wearer.

BACKGROUND

Haptic feedback can be used to provide information to a user through the user's sense of touch. For example, contemporary cellular telephones and other similar electronic devices may use vibrations to denote various events, such as when a touchscreen or home button is pressed. Other electronic devices, such as joysticks used in gaming systems, can vibrate or produce a force as feedback when a user interacts with onscreen actions in a video game.

But many portable electronic devices continue to decrease in size while the number of uses and functions of the electronic devices can remain the same or increase. For example, some cellular phones and digital music players are contained within small and compact housings that include electronic circuits and components that provide a user with a wide range of applications and functions. Space can therefore be an issue when including or adding additional components, circuits, and functions to a portable electronic device.

SUMMARY

In one aspect, a band can include one or more haptic actuators, where each haptic actuator is oriented along a respective axis on the band. A processing device can be operatively connected to each haptic actuator. The processing device can be adapted to output an activation signal for at least one haptic actuator to produce haptic feedback defined by at least one haptic characteristic.

In another aspect, a band can include one or more haptic actuators. A method for providing haptic feedback to a wearer of the band based on at least one event can include receiving a selection of an event and receiving one or more selected haptic characteristics for the event. The one or more selected haptic characteristics can be associated with the selected event, where the one or more selected haptic characteristics control a haptic response of at least one haptic actuator.

BRIEF DESCRIPTION OF THE DRAWINGS

Embodiments of the invention are better understood with reference to the following drawings. The elements of the drawings are not necessarily to scale relative to each other. Identical reference numerals have been used, where possible, to designate identical features that are common to the figures.

DETAILED DESCRIPTION

Embodiments described herein can provide a band that includes one or more haptic actuators that can be activated to provide haptic stimulation to the skin of a wearer. An electronic device can be in communication with the one or more haptic actuators through a wired and/or wireless connection. The electronic device can be a separate device, or the electronic device can be removably or fixedly attached to the band. When the electronic device is attached to the band, including the one or more haptic actuators in the band instead of in the electronic device reduce the size of the electronic device, or space can be saved in the electronic device for other components. The electronic device can be any type of electronic device, including, but not limited to, a digital music player, a computing device, and a biometric monitor.

A processing device can be included in the electronic device that transmits activation signals to the haptic actuator or actuators. Each haptic actuator can produce a selected force (e.g., pressure), motion, and/or vibratory response into a surface of the band, thereby providing tactile stimulation to the skin of the person wearing the band. An activation signal can be sent at select times to a single haptic actuator or to groups of two or more haptic actuators. Haptic stimulation can act as notifications for one or more events, such as the receipt of an email, a text message, a news story, a stock price, a reminder, and/or a low power state of a power source in the electronic device.

Figure 1:
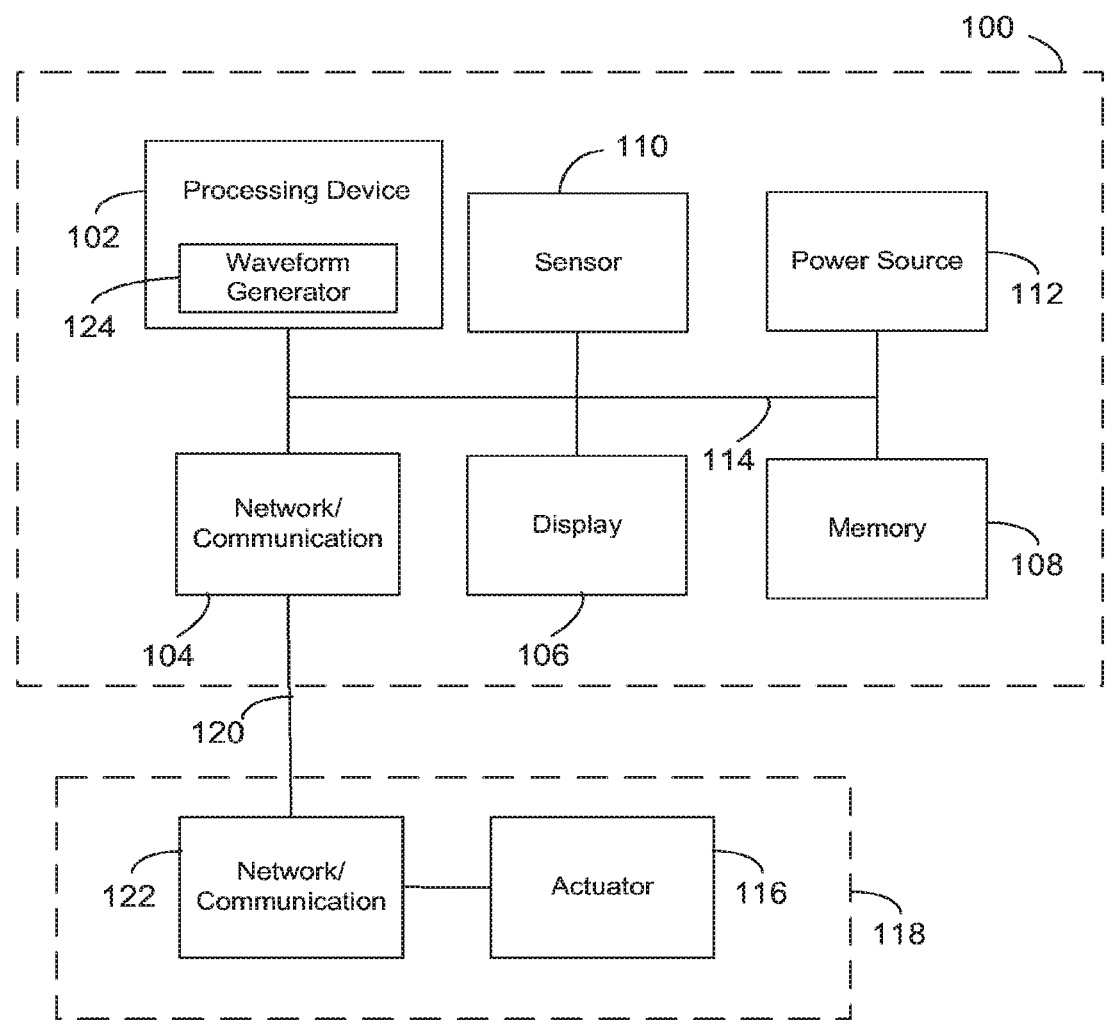
FIG. 1 is an illustrative block diagram of an electronic device that can be in communication with one or more haptic actuators included in a band that is worn by a wearer.

FIG. 1 is an illustrative block diagram of an electronic device that can be in communication with one or more haptic actuators included in a band that is worn by a wearer. The electronic device 100 can include a processing device 102, a network communication interface 104, a display 106, a memory 108, one or more sensors 110, and a power source 112. The processing device 102 can control some or all of the operations of the electronic device 100. The processing device 102 can communicate, either directly or indirectly, with substantially all of the components of the electronic device 100. For example, a system bus or signal line 114 or other communication mechanisms can provide communication between the processing device 102, the network communication interface 104, the display 106, the memory 108, the one or more sensors 110, and/or the power source 112. The processing device 102 can be implemented as any electronic device capable of processing, receiving, or transmitting data or instructions. For example, the processing device 102 can be a microprocessor, a central processing unit (CPU), an application-specific integrated circuit (ASIC), a digital signal processor (DSP), or combinations of such devices. As described herein, the term "processing device" is meant to encompass a single processor or processing unit, multiple processors, multiple processing units, or other suitably configured computing element or elements.

The network communication interface 104 can facilitate transmission of data to or from other electronic devices. For example, a network communication interface can transmit electronic signals via a wireless and/or wired network connection. Examples of wireless and wired network connections include, but are not limited to, cellular, WiFi, Bluetooth, IR, Ethernet, and radio such as near field communication.

The display 106 may provide an image or video output for the electronic device 100. The display may also provide an input surface for one or more input devices, such as, for example, a touch sensing device and/or a fingerprint sensor. The display 106 may be substantially any size and may be positioned substantially anywhere on the electronic device 100. The display 106 can be implemented with any suitable technology, including, but not limited to, a multi-touch sensing touchscreen that uses liquid crystal display (LCD) technology, light emitting diode (LED) technology, organic light-emitting display (OLED) technology, organic electroluminescence (OEL) technology, or another type of display technology.

The memory 108 can store electronic data that can be used by the electronic device 100. For example, a memory can store electrical data or content such as audio files, applications, user preferences, timing signals, video files and images, data structures or databases, documents, and device and application settings. The memory 108 can be configured as any type of memory. By way of example only, the memory can be implemented as random access memory, read-only memory, Flash memory, removable memory, or other types of storage elements, or combinations of such devices.

The electronic device 100 may also include one or more sensors 110 positioned substantially anywhere on the electronic device 100. The sensor 110 may be configured to sense substantially any type of characteristic, such as but not limited to, images, pressure, light, touch, heat, movement, relative motion, biometric data, and so on. For example, a sensor 110 may be an image sensor, a heat sensor, a light or optical sensor, an accelerometer, a pressure transducer, a gyroscope, a magnet, a biometric sensor, and so on.

The power source 112 can be implemented with any device capable of providing energy to the electronic device 100. For example, the power source 112 can be one or more batteries or rechargeable batteries, or a connection cable that connects the remote control device to another power source such as a wall outlet.

The processing device 102 is in communication and operatively connected to one or more haptic actuators 116 that are included in a band or strap 118 worn by a user. Each haptic actuator can produce a selected force (e.g., pressure), motion, and/or vibratory response into the surface of the band, thereby providing tactile stimulation to the skin of the person wearing the band. The one or more haptic actuators can be implemented with any suitable haptic technology, including, but not limited to, electromagnetic technology, piezoelectric technology, and/or electro-reactive polymers. The processing device 102 can transmit activation signals to one or more selected haptic actuators through a wired and/or wireless network connection 120 created between network communication interface 104 in the electronic device 100 and network communication interface 122 in the band 118. Based on the received signal(s), each haptic actuator 116 produces a tactile vibration in the band (or the surface of the band) under and around the haptic actuator.

The processing device 102 can include a waveform generator 124 configured to dynamically produce waveforms appropriate to activate selected haptic actuators 116 to produce tactile vibrations. In some embodiments, the processing device 102 can access the memory 108 to retrieve waveform data that is received by the waveform generator 124. The waveform generator 124 can produce an appropriate waveform for one or more of the haptic actuators 116. As will be described in more detail later, an appropriate waveform can be determined by one or more haptic characteristics, such as frequency, timing, direction, and/or duration.

Figure 3:
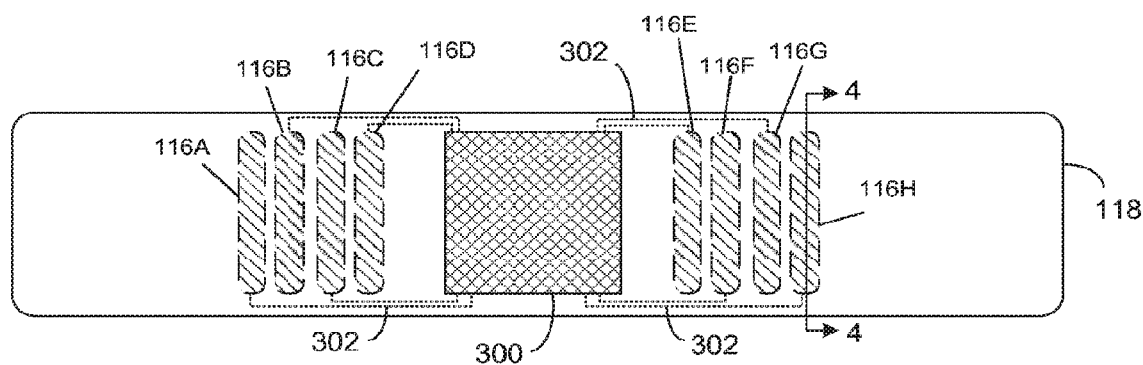
FIG. 3 is a top view of an electronic device attached to a band that includes one or more haptic actuators.

It should be noted that FIG. 1 is illustrative only. In other examples, an electronic device may include fewer or more components than those shown in FIG. 1. For example, when the electronic device can be attached to the band, the network connection 120 and the network communication interface 122 in the band 118 can be omitted and the activation signals transmitted to the haptic actuators via signal lines included in the band. FIG. 3 depicts signal lines embedded in a band.

As another example, an electronic device can include one or more input/output (I/O) devices that can receive data from a user or one or more other electronic devices. One example of an I/O device is button, such as a home button, a button to increase or decrease volume, and/or an on/off button. An I/O device can include a touch sensing input surface such as a trackpad, one or more buttons, one or more microphones or speakers, one or more ports such as a microphone port, and/or a keyboard.

In some embodiments, the components shown in the electronic device 100 can be omitted from the device but included in the band 118. Additionally or alternatively, one or more components in the electronic device 100 can be duplicated in the band 118. For example, a processing device can be included in the band and connected between the network communication interface 122 and the haptic actuators 116.

Figure 2:
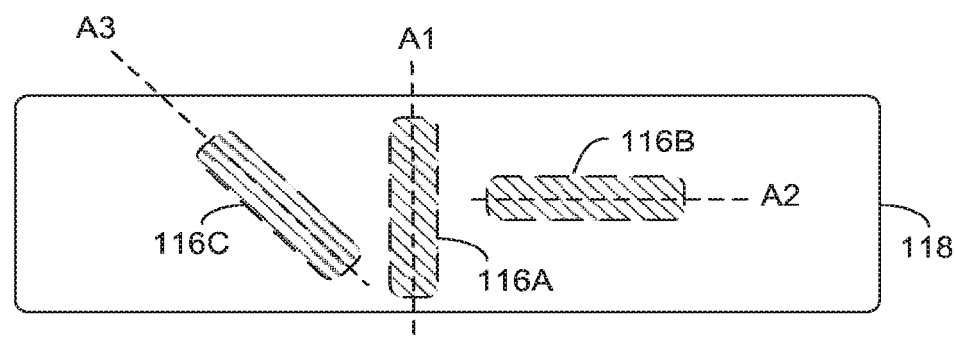
FIG. 2 is a top view of a band illustrating various orientations for a haptic actuator included in the band 118 shown in FIG. 1.

Referring now to FIG. 2, there is shown a top view of a band illustrating various orientations for a haptic actuator included in the band 118 shown in FIG. 1. In the illustrated embodiment, three haptic actuators 116A, 116B, and 116C are each oriented along a different axis A1, A2, and A3, respectively. The haptic actuators 116A, 116B, 116C can be embedded within the band 118 and are therefore depicted with dashed lines in FIG. 2. As one example, each haptic actuator can be sewn into the band or attached with an adhesive. The band 118 can be made of any suitable material, such as leather, metal, silicone or rubber, nylon, and ceramic.

Each actuator 116A, 116B, 116C can be configured to produce one or more selected force, motion, and/or vibratory responses. By way of example only, the haptic actuator 116A can move or vibrate laterally along the axis A1 (i.e., up and down in the figure). Similarly, haptic actuator 116B can produce a force on a surface of the band 118, which can be detected at a contact location on the skin of the wearer. The haptic actuators 116A, 116B, 116C can be distributed around the band in any given arrangement.

FIG. 3 is a top view of an electronic device attached to a band that includes one or more haptic actuators. In some embodiments, the electronic device 300 can be removably attached to the band 118, such as with fastening or locking features, or through other attachment mechanisms such as a pocket. This can allow a user to attach different types of electronic devices to the band that interact with the haptic actuators 116. In other embodiments, the electronic device 300 can be fixedly attached to the band 118. Example electronic devices include a digital music player, a biometric monitor, a computing device, and a watch.

Selected haptic actuators 116 can receive an activation signal from the electronic device 300 via signal lines or traces 302. The signal lines 302 can be embedded in the band 118 as well as the haptic actuators 116, and are therefore shown with dashed lines in FIG. 3. Other embodiments can use different transmission mechanisms to transmit the activation signals to the haptic actuators. For example, a flexible circuit or soft contact pads formed with a conductive polymer can be used to transmit activation signals to the haptic actuators.

An activation signal can be sent to a single haptic actuator or to groups of two or more haptic actuators. In example embodiments, the haptic actuator 116A can be activated by itself, or the haptic actuators 116C, 116D, 116E, 116F can be simultaneously activated. In another embodiment, the haptic actuators 116A through 116H can be activated sequentially one at a time or in groups in a variety of sequences. For example, one sequence can include activating each haptic actuator one at a time in the order 116A, 116B, 116C, 116D, 116E, 116F, 116G, 116H. As another example, one sequence can include activating each haptic actuator in groups of two in the order 116A and 116H, 116B and 116G, 116C and 116F, and then 116D and 116E.

Figure 4:
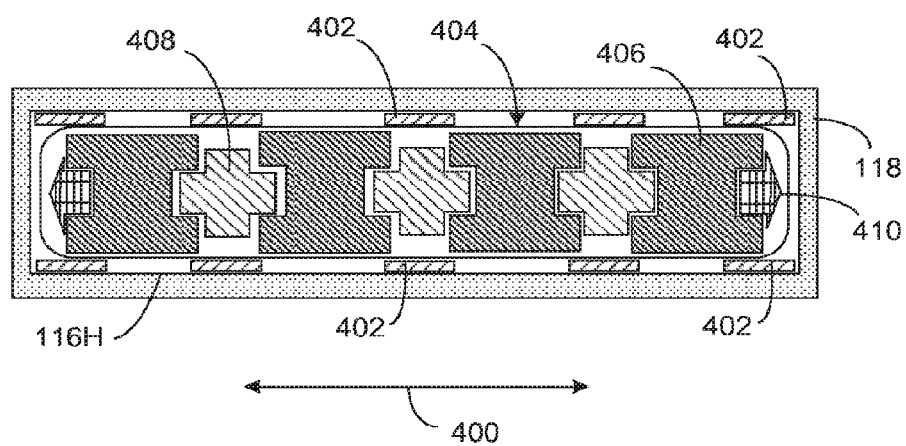
FIG. 4 is a cross-sectional view of the band and a haptic actuator taken along line 4-4 in FIG. 3.

FIG. 4 is a cross-sectional view of the band and a haptic actuator taken along line 4-4 in FIG. 3. In the illustrated embodiment, the haptic actuator 116H is an electromagnetic actuator that can produce motion in the directions indicated by arrows 400. In other embodiments, the haptic actuator 116H can produce motion in only one direction.

The electromagnetic actuator 116H includes coils or windings of wire 402 wrapped around a core 404. This type of actuator is known as a solenoid. The core 404 can include first magnets 406 with ferromagnetic spacers 408 positioned between each pair of first magnets 406. The first magnets 406 produce a magnetic field when an electrical current is passed through the solenoid, which can cause the actuator to move. The direction and velocity of the movement can be controlled by the amount and direction of the current through the coils 402. Bumpers 410 can be positioned at the ends of the core to protect the adjacent first magnets 406 from damage and from striking the edges of the core 404.

Other embodiments can construct a haptic actuator differently. As described earlier, the haptic actuators can be implemented with any suitable haptic technology, including, but not limited to, electromagnetic technology, piezoelectric technology, and/or electro-reactive polymers.

Figure 5:
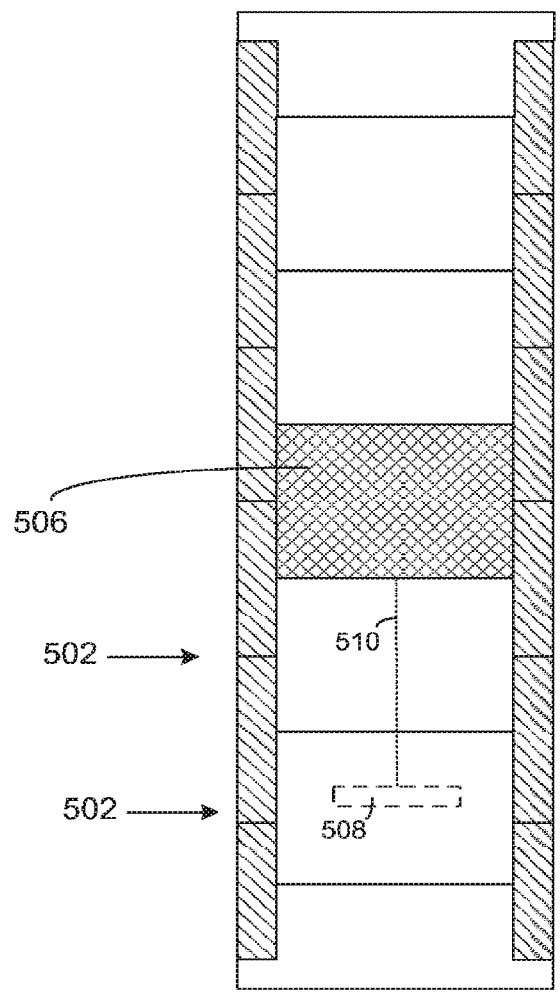
FIG. 5 is a top view of an electronic device attached to a linked band that includes one or more haptic actuators.
Figure 6:
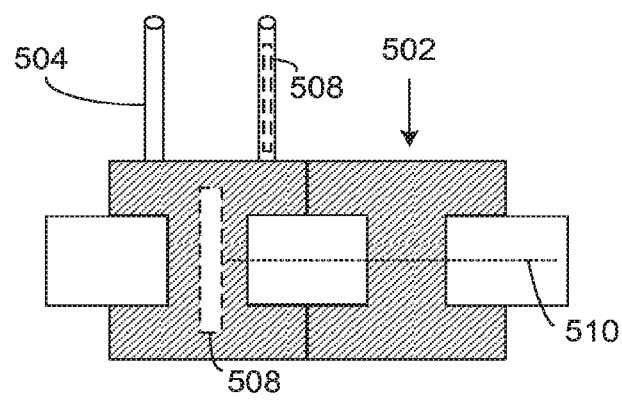
FIG. 6 is a bottom view of the linked band shown in FIG. 5.

Referring now to FIG. 5, there is shown a top view of an electronic device attached to a linked band that includes one or more haptic actuators. FIG. 6 is a bottom view of the linked band shown in FIG. 5. With reference to FIGS. 5 and 6, the linked band 500 includes multiple links 502 held together with one or more pins 504. The linked band 500 can be constructed as a pin and center link locking tube bracelet or a split pin bracelet in some embodiments.

An electronic device 506 can be attached to the linked band 500 using any suitable attachment mechanisms, such as with a spring bar (not shown) positioned on each side of the electronic device to hold the band to the electronic device. In some embodiments, a haptic actuator 508 can be included in one or more links 502 of the band 500, one or more pins 504 used to hold the links 502 together, or in one or more pins and links in the band 500. Although FIG. 5 shows only one signal line 510 running through the links 502, additional signal lines or traces (e.g., signal lines 302 in FIG. 3) can be routed to respective haptic actuators 508 through one or more links and/or through one or more pins in some embodiments.

Embodiments can position the one or more haptic actuators 508 in any suitable location and/or orientation in the linked band. Each haptic actuator can be configured to produce a force in one or more contact locations, or to produce a motion, and/or vibration in one or more directions.

Figure 7:
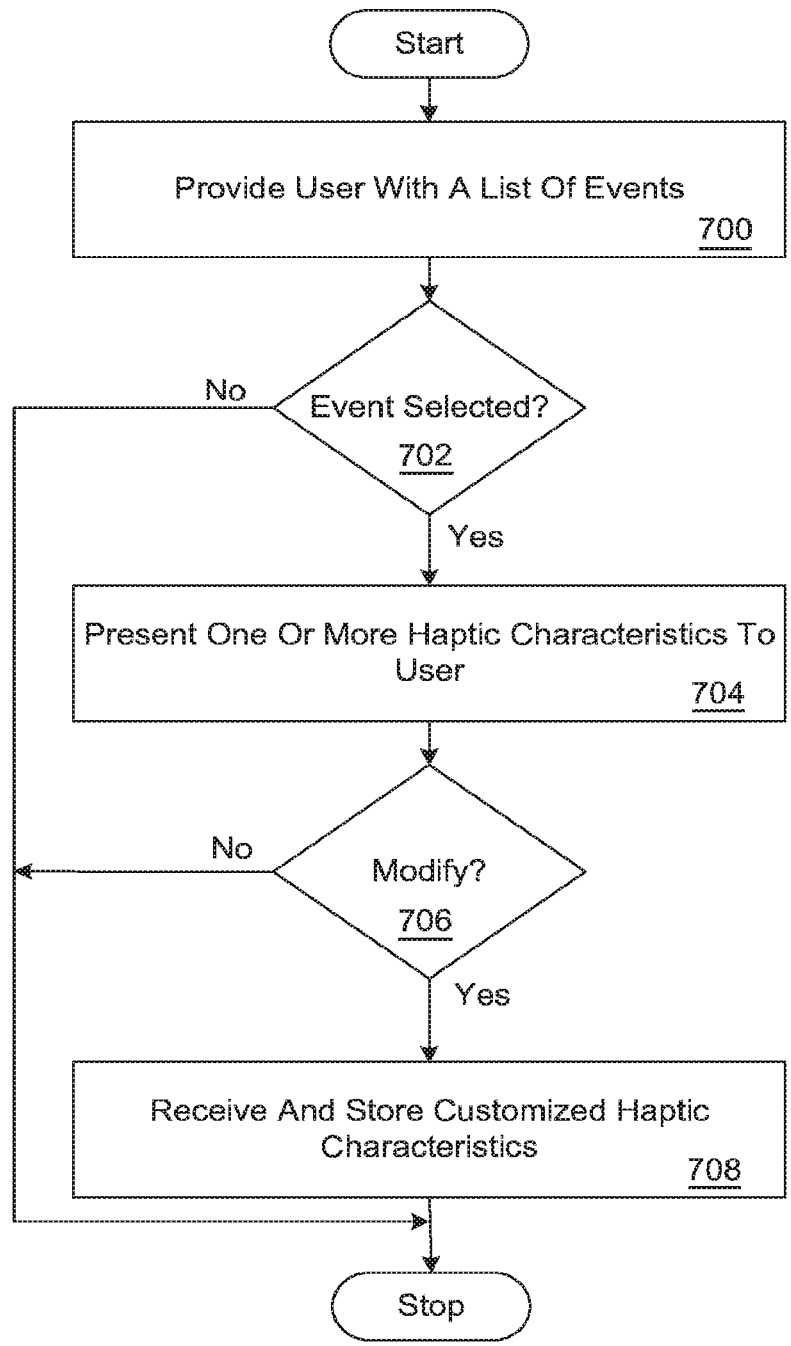
FIG. 7 is a flowchart of a method for customizing haptic feedback for one or more haptic actuators in a band.

FIG. 7 is a flowchart of a method for customizing haptic feedback for one or more haptic actuators in a band. Initially, a list of events can be presented to a user at block 700. The list of events can include events that can be generated or received by an electronic device. The list of events can be associated with an application and/or function running on, or connected to the electronic device. A wearer of the band can be notified of one or more events with haptic feedback. For example, haptic feedback can be produced when an email or text message is received, when a voicemail or call is received (when the electronic device is a mobile telephone), when the power source (e.g., 112 in FIG. 1) is in a low power state, when a navigation program provides turn-by-turn directions, and/or when an emergency alert is received. Haptic feedback can be used to notify a wearer of an upcoming meeting or activity scheduled in a calendar program. The notifications can be event-based and/or location-based. For example, a user can receive news alerts or notifications for particular events, such as sporting events. Similarly, the notifications can relate to one or more particular geographical locations, such as a city or neighborhood. Notifications can be associated with the weather, when a motion sensor is activated in the home, and/or when a car alarm is activated. These example events are illustrative only, and haptic feedback can be used to notify a wearer of other types of events.

Next, as shown in block 702, a determination is made as to whether an event has been selected by the user. If not, the method ends. When an event is selected, the process passes to block 704 where one or more haptic characteristics can be presented to the user. Example haptic characteristics include, but are not limited to, whether to receive haptic feedback or not, a number of haptic actuators to be activated for haptic stimulation, the specific actuator or actuators to be activated, the timing of the activation of one or more haptic actuators, a frequency or intensity of the haptic feedback, a direction or type of movement, and/or the duration of the haptic feedback. The one or more haptic characteristics can be presented as a list in a menu or through a set of radio buttons or dialog boxes. In some embodiments, the presentation of haptic characteristics can be organized by the type of haptic stimulation, such as by a force or by a movement. A user can customize the haptic feedback by specifying particular information for the one or more haptic characteristics. As one example, a user can specify movement in one direction at a given intensity for a particular time period.

In some embodiments, the haptic characteristic(s) associated with an event can be set at a default setting. For example, the default setting can be set to disable the haptic stimulation, or set to a given setting that produces a minimum level of haptic feedback. The method shown in FIG. 7 can allow the user to modify the default settings.

A determination is then made at block 706 as to whether a user has modified one or more haptic characteristics for the selected event. If not, the method ends. When a user has modified one or more haptic characteristics, the method continues at block 708 where the customized haptic characteristic(s) are received and stored in a memory (e.g., memory 108 in FIG. 1). The customized haptic characteristic(s) can then be used each time a notification is to be sent to a user.

Various embodiments have been described in detail with particular reference to certain features thereof, but it will be understood that variations and modifications can be effected within the spirit and scope of the disclosure. And even though specific embodiments have been described herein, it should be noted that the application is not limited to these embodiments. In particular, any features described with respect to one embodiment may also be used in other embodiments, where compatible. Likewise, the features of the different embodiments may be exchanged, where compatible.

We claim:

1. A system, comprising:
    a band comprising silicone and a conductive polymer;
    a haptic actuator oriented along an axis on the band; and
    a processing device electrically connected to the haptic actuator by the conductive polymer and adapted to output an activation signal for the haptic actuator to produce haptic feedback defined by at least one haptic characteristic.

2. The system as in claim 1, wherein the processing device is included in a first electronic device attached to the band.

3. The system as in claim 2, wherein the electronic device includes a display.

4. The system as in claim 2, wherein the electronic device comprises a watch.

5. The system as in claim 2, wherein the electronic device comprises a digital music player.

6. The system as in claim 2, further comprising one or more sensors operatively connected to the processing device.

7. The system as in claim 2, wherein the electronic device comprises a biometric monitor.

8. The system as in claim 1, wherein the haptic actuator comprises an electromagnetic actuator.

9. A method for providing haptic feedback to a wearer of a band comprising a plurality of links connected together by pins, the method comprising:
    receiving a selection of an event;
    receiving a selection of one or more haptic characteristics for the event;
    associating the one or more haptic characteristics with the event;
    actuating at least one of:
        a first haptic actuator within the band and oriented along a first axis; or
        a second haptic actuator within the band and oriented along a second axis different from the first axis;
    wherein at least one of the first haptic actuator and the second haptic actuator is included in one of the links or one of the pins; and
    wherein the one or more haptic characteristics control a haptic response of the first haptic actuator or the second haptic actuator.

10. The method as in claim 9, further comprising displaying a list of events prior to receiving the selection of the event.

11. The method as in claim 9, further comprising storing the associated one or more haptic characteristics and the event in a memory.

12. A watch, comprising:
    a watch body;
    a band removably coupled to the watch body and comprising a plurality of links connected together by a plurality of pins; and
    a haptic actuator incorporated within one of the links or one of the pins and configured to produce haptic feedback in response to a signal from the watch body.

13. The watch as in claim 12, wherein the watch body includes a network connection interface.

14. The watch as in claim 13, wherein the watch body includes a processing device and the processing device is operatively connected to the haptic actuator through the network connection interface and a network connection.

15. The watch of claim 12, wherein the haptic actuator comprises a solenoid.

* * * * *